J. HALL.
TEA AND COFFEE POTS.
No. 194,518.                    Patented Aug. 28, 1877.
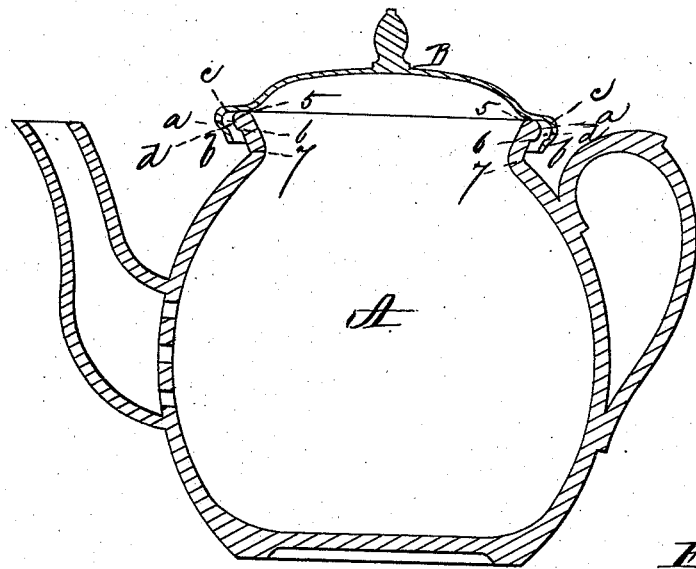
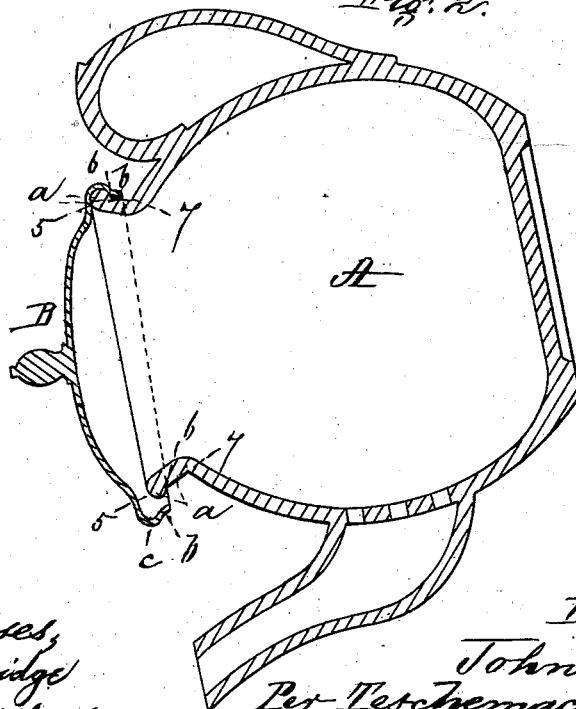
Witnesses,
W. J. Cambridge
Chas. E. Griffin
Inventor,
John Hall
Per Teschemacher & Stearns,
Attorneys.

UNITED STATES PATENT OFFICE.

JOHN HALL, OF BOSTON, MASSACHUSETTS.

IMPROVEMENT IN TEA AND COFFEE POTS.

Specification forming part of Letters Patent No. 194,518, dated August 28, 1877; application filed July 26, 1877.

*To all whom it may concern:*

Be it known that I, JOHN HALL, of Boston, in the county of Suffolk and State of Massachusetts, have invented an Improvement in Tea and Coffee Pots, of which the following is a full, clear, and exact description, reference being had to the accompanying drawings, making part of this specification, in which—

Figure 1 is a central vertical section through a tea-pot and its cover constructed in accordance with my invention. Fig. 2 is a similar section, the pot being turned up in a position to pour out the beverage contained therein. Fig. 3 is an enlarged section of a portion of the top of the pot and a portion of its lid or cover.

Earthenware coffee or tea pots of the present construction are objectionable, for the reason that the lid or cover (unless hinged) is liable to drop off when the pot is inclined in pouring out its contents, resulting in the breaking of the cup or saucer.

To overcome the above-mentioned objection is the purpose of my present invention, which consists in a pot provided at its top with a flange or lip flaring outward, in combination with a lid or cover provided with a flange inclined inward, the lower edge of the flange of the cover being of a diameter only just sufficient to allow it to pass over the upper rim of the flange of the pot, by which construction the flange of the cover fits loosely around the rim of the top of the pot when at rest in its normal position, and when the pot is inclined, as in the position it occupies when its contents are being poured out, the rear lower edge of the cover catches or hooks over the under side of the rear of the flange of the pot, by which the cover is suspended and all possibility of its dropping off, incident to tea-pots without hinged or pivoted covers, as heretofore constructed, is entirely avoided.

To enable others skilled in the art to understand and use my invention, I will proceed to describe the manner in which I have carried it out.

In the said drawings, A represents a tea or coffee pot of earthenware, china, &c., having the outside of its top terminating in a flange or annular projection, $a$, of the form seen, being rounded in cross-section from 5 to 6, from which latter point, 6, the top inclines slightly inward and downward for a short distance to a point, 7, when it slopes or tapers rapidly outward, this outward-flaring flange $a$ at the top of the pot being formed in one and the same piece as the body of the pot, or being formed by an annular band or ring of metal fitted or sprung thereover. B is a lid or cover, having its outer rim provided with a flange, $b$, inclining downward and inward therefrom, a shallow annular depression or groove, $c$, being formed at its top, (just under the cover,) the diameter of this groove being greater than the diameter of the annular flange or projection $a$ at the top of the pot, while the diameter of the lower edge of the flange $b$ of the lid is exactly the same as that of the flange $a$, by which construction the lid is free to fit over the top of the pot, a space, $d$, (between the groove $c$ and the flange $a$,) extending entirely around the top of the pot when it is at rest in its normal position. When, however, the pot is inclined, as in the position it occupies while its contents are being poured out, (see Fig. 2,) the rear lower edge of the flange of the cover comes in contact with and hooks or catches over the under side or under rear edge of the flange $a$ at the top of the pot, and remains suspended thereon, the weight of the cover causing the edge of its flange $b$ at all other points in its circumference to be removed a short distance from the flange $a$ of the top, the space between them increasing gradually from the point of suspension (and on each side thereof) to the under side or front of the flange $a$ of the top, diametrically opposite the point of suspension at its rear, the result being that the cover will not drop off, and the cup or saucer is not broken, as is frequently the case in the use of tea-pots and covers of the ordinary construction.

I am aware that Letters Patent of the United States No. 143,116, granted to W. Bates on the 23d September, 1873, for tea-kettles, show the upper rim of the pot provided on its inside with an annular groove and a cover fitting within the top of the pot instead of outside thereof, and provided with a flange which slides in the said groove when the pot is turned up in position for turning out its contents. To this construction I therefore lay no claim.

What I claim as my invention, and desire to secure by Letters Patent, is—

The pot A, having its top provided with a flange or projection, a, which inclines upward and outward, in combination with the lid or cover B, provided with a flange, b, which inclines downward and inward, substantially as described, for the purpose set forth.

Witness my hand this 21st day of July, A. D. 1877.

JOHN HALL.

In presence of—
  N. W. STEARNS,
  CHAS. E. GRIFFIN.